Sept. 16, 1924.  
W. P. FITZGERALD  
AUTOMATIC CLUTCH RELEASE  
Filed May 14, 1921

1,508,842

W. P. Fitzgerald, Inventor

By C. A. Snow & Co.
Attorney

Patented Sept. 16, 1924.

1,508,842

UNITED STATES PATENT OFFICE.

WILLIAM P. FITZGERALD, OF PRINCESS ANNE, MARYLAND.

AUTOMATIC CLUTCH RELEASE.

Application filed May 14, 1921. Serial No. 469,697.

*To all whom it may concern:*

Be it known that I, WILLIAM P. FITZGERALD, a citizen of the United States, residing at Princess Anne, in the county of Somerset and State of Maryland, have invented a new and useful Automatic Clutch Release, of which the following is a specification.

This invention relates to tractors, and more particularly to a novel means associated with the clutch pedal thereof for automatically throwing out the clutch when the tractor is suddenly stopped, thereby eliminating the possibility of the tractor turning over rearwardly.

The primary object of the invention is the provision of means associated with the clutch releasing member for locking the clutch out of operation.

A further object of the invention is to provide a locking means of this character which will automatically lock the clutch actuating member, and one which may be readily and easily thrown out of locked relation with the clutch actuating member.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
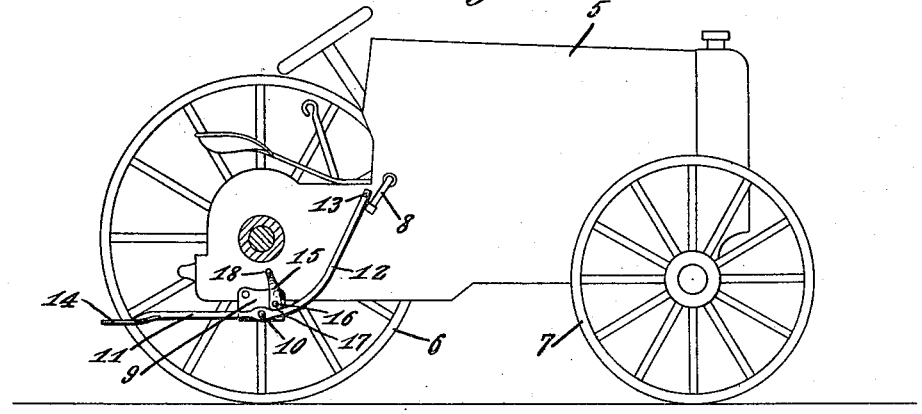
Figure 1 is a side elevational view of a tractor, one of the rear wheels thereof being removed and showing the invention as applied thereto.

Referring to the drawing in detail, the reference character 5 designates the body portion of the tractor, which is supported by the wheels 6 and 7, the tractor being provided with the usual clutch pedal 8, by means of which the clutch may be thrown into and out of operation.

The clutch actuating means forming the essence of the present invention includes a plate 9, which is provided with suitable openings formed adjacent to the upper edge thereof, through which bolts may be passed for securing the plate 9 to the tractor body.

A laterally extending pin 10 is formed on the plate and forms a support for the clutch actuating arm 11, which has an upwardly curved portion 12, the extreme upper end of the portion 12 being formed at right angles as at 13, so that the same will contact with the clutch pedal 8 when the end 13 is moved downwardly.

A relatively wide ground engaging member 14 is formed at one end of the arm 11 and normally lies in a plane parallel with the surface over which the device is operated, so that when the tractor pivots upwardly, incident to the same striking an obstruction, the ground engaging portion 14 will move downwardly and contact with the ground surface. The tractor continuing on its upward movement, throws the clutch pedal against the right angled extremity 13 to the end that the clutch pedal is thrown out of operation and the tractor now descends by gravity to its normal position.

Figure 2:
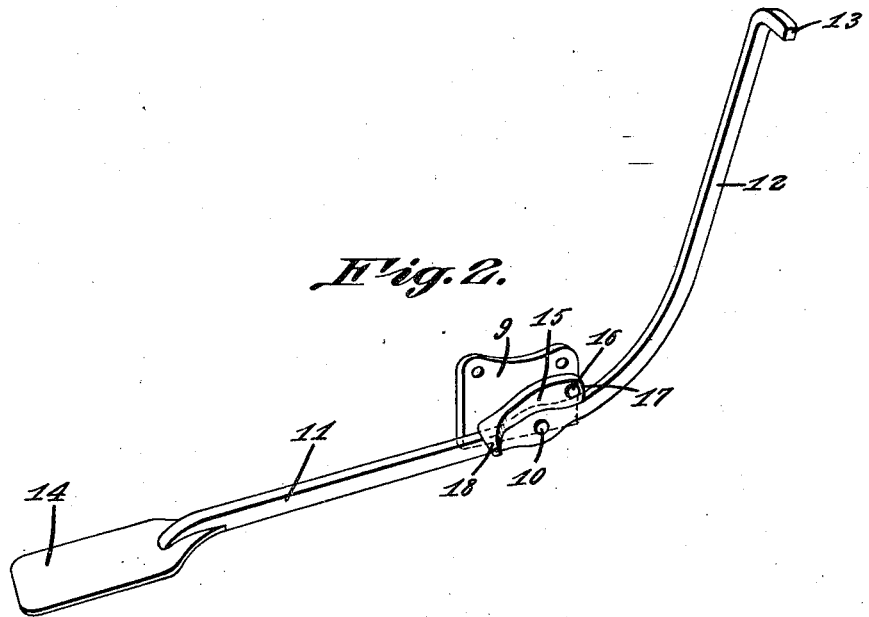
Figure 2 is a perspective view of the clutch actuating arm and the locking means.

In order that the clutch pedal will be held in a position to hold the clutch out of operation, a locking means is provided, which locking means includes a locking arm 15 which has pivotal connection with the plate 9 as by means of the pivot pin 16. The extreme lower end of the locking arm 15 is curved as at 17 to conform to the curvature of the arm 11, so that when the arm 11 is rocked by an upward movement of the ground engaging end of arm 11, the curved surface of the locking arm 15 will slide over the curved surface of the arm 11, and fall to a position as indicated by Figure 2 of the drawing, whereupon the arm 11 is locked in a position to hold the clutch out of operation.

The locking arm 15 is provided with an enlarged end 18 whereby the operator may, by placing his foot thereon, move the arm 15 to a position as indicated by Figure 1 of the drawing, whereupon the clutch is free to move into operation.

Having thus described the invention, what is claimed as new is:—

In combination with a tractor and the clutch pedal thereof, a plate having a pivot pin extending laterally therefrom, secured to the tractor, a relatively long arm having an upwardly extended end supported on the pivot pin, said upwardly extended end adapted to normally engage the clutch pedal, a locking arm pivotally connected to the plate at a point adjacent to one end of the arm, and laterally with respect to the pivot pin, one end of the locking arm being curved to cooperate with the first mentioned arm to lock the arm in its active position, and said locking arm having an enlarged end adapted to be engaged by the foot of the operator to lift the locking arm to its inactive position.

In testimony that I claim the foregoing as my own, I have hereto affixed my signature in the presence of two witnesses.

WILLIAM P. FITZGERALD.

Witnesses:
HARRY C. DARHEILL,
JOHN B. ROBERTS.